Sept. 3, 1935.  A. PANZICA  2,013,064

TIRE CHAIN

Filed Feb. 7, 1934

INVENTOR
A. Panzica
BY
ATTORNEY

Patented Sept. 3, 1935

2,013,064

UNITED STATES PATENT OFFICE 2,013,064

TIRE CHAIN

August Panzica, Lodi, Calif.

Application February 7, 1934, Serial No. 710,119

2 Claims. (Cl. 152—14)

My invention relates to traction or antiskid attachments for motor vehicle tires, my principal object being to provide an improved device of this character especially adapted and designed for use in snow, or relatively deep mud and the like, where the ordinary skid chain proves inadequate to give the desired traction.

My attachment is put on and taken off in the same manner as the ordinary skid chain and in fact incorporates certain features of the latter.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
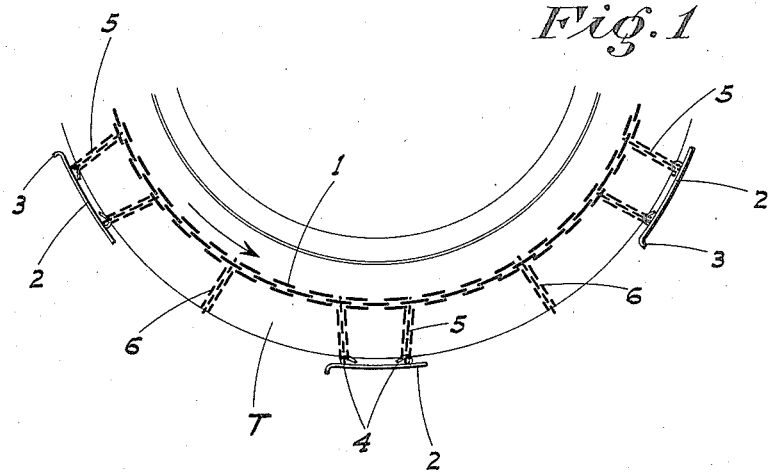
Figure 1 is a fragmentary side outline of a tire with my improved non-skid attachment applied thereto, shown in somewhat diagrammatic form.

Referring now more particularly to the characters of reference on the drawing, the numeral 1 denotes a pair of transversely spaced side chains of the attachment, which are adapted to extend about a tire T on opposite sides of the same and to be detachably connected together at their ends to form an endless unit in the same manner as the ordinary tire chain.

The traction elements mounted in connection with said chains comprise a plurality of rigid plates 2, of heavy sheet metal and having outwardly turned flanges 3 extending across one end and forming the equivalent of grousers. These plates are disposed between the chains in symmetrical relation thereto and are spaced evenly along the same, having a concave curvature on their inner faces of a radius not less than the tread diameter of the tire. Transversely however said plates are straight.

Transverse sleeves 4 project from the inner faces of the plates toward their ends and centrally of their width, said sleeves being formed by slitting the plates lengthwise from their ends a certain distance and bending the metal strips between the slits inwardly and toward each other as shown. These sleeves form the means for permanent connecting engagement with the central individual links of cross chains 5, which extend between and are permanently connected to the chains 1.

Figure 2:
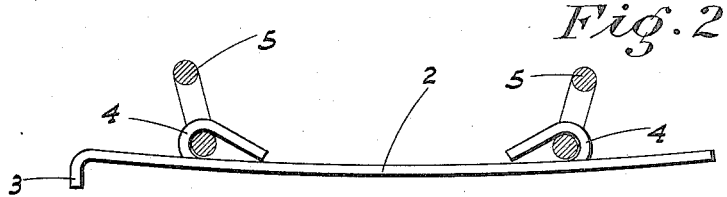
Figure 2 is a side elevation of one of the traction plates detached.
Figure 3:
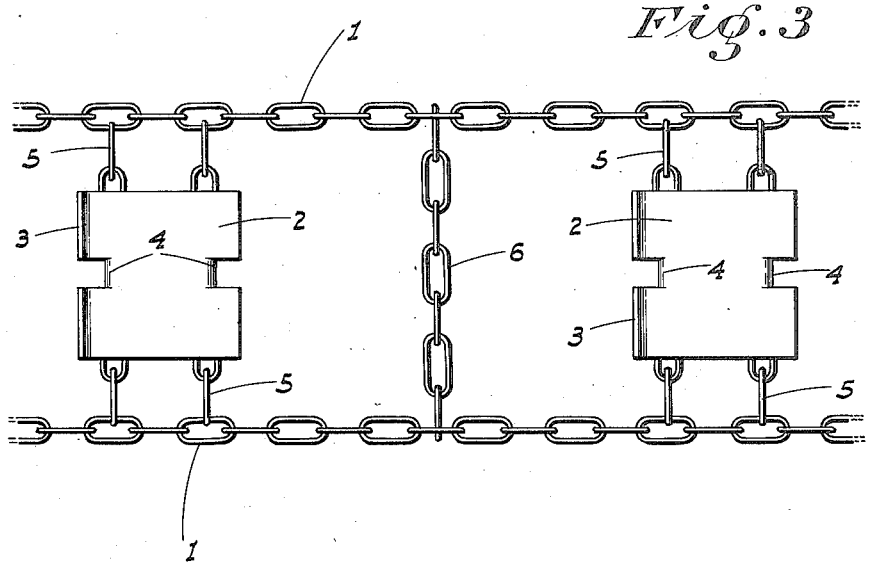
Figure 3 is a fragmentary plan view of the attachment.

The sleeves are relatively narrow so that each engages only a single link of the cross chain, thus enabling the latter to extend about and properly conform to the cross sectional contour of the tire, while the tread plates whose width approximates that of the cross sectional diameter of the tire, rest flatly on the snow etc. and provide the necessary traction. Also each sleeve only embraces one side of the chain link as shown in Figure 2 so that a hinge or swivel connection is provided, while preventing relative transverse shifting of the plate and chain.

Other cross chains 6 connect the chains 1 between the traction plates, said chains having of course a certain amount of tractive action as well as holding the chains 1 in the proper and substantially circular path about the tire.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A traction attachment for a tire comprising a plurality of ground engaging tread plates to extend in spaced relation about a tire, sleeves formed on and projecting inwardly from the inner face of each plate centrally of its width and spaced back from the ends thereof, and a supporting structure for the plates adapted to be mounted on the tire and including a pair of flexible elements for each plate to extend transversely about the tire in contact therewith and engaging the sleeves of the corresponding plate.

2. A traction attachment for a tire comprising a plurality of ground engaging tread plates to extend in spaced relation about a tire, sleeves formed on and projecting inwardly from the inner face of each plate centrally of its width adjacent the ends thereof, and a supporting structure for the plates adapted to be mounted on the tire and including a pair of cross chains for each plate to extend transversely about the tire in contact therewith and consisting of open oblong links, the sleeves being of lesser width than the interior length of a link and one side only of the latter passing through the corresponding sleeve.

AUGUST PANZICA.